Jan. 20, 1970  YOSHIO ISHIDA  3,491,175
METHOD FOR COVERING ARTICLES WITH A LAYER OF ANY DESIRED
WOOD-GRAIN PATTERN
Filed June 19, 1967

United States Patent Office 3,491,175
Patented Jan. 20, 1970

3,491,175
METHOD FOR COVERING ARTICLES WITH A LAYER OF ANY DESIRED WOOD-GRAIN PATTERN
Yoshio Ishida, Kameyama-shi, Japan, assignor to Kameyama Kogyo Kabushiki Kaisha, Kameyama-shi, Mieken, Japan, a joint-stock company of Japan
Filed June 19, 1967, Ser. No. 647,092
Claims priority, application Japan, July 5, 1966, 41/43,781
Int. Cl. B32b 21/00, 3/26; C04b 39/00
U.S. Cl. 264—134                2 Claims

ABSTRACT OF THE DISCLOSURE

A covering of any desired wood-grain pattern is formed on an article by laying a composite layer of thin ruffled elements of string-like form on the article and moulding the layer, the ruffled elements being prepared by forming thin film sheets of a fibrous plant material such as a wood, coating the sheets with an adhesive, and crimping and ruffling the sheets into the ruffled elements.

---

Figure 1:
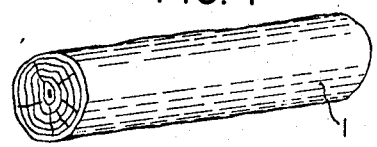

This invention relates generally to techniques in covering the surfaces of various articles with decorative materials and to techniques in utilizing natural plant materials.

More specifically, the invention concerns a new method for moulding decorative covering layers of diversified grain patterns on the base structures of various articles, each covering layer being composed of a large number of ruffled elements made of thin films of a fibrous plant material such as wood or bamboo.

For articles such as pieces of furniture, paneling, trimmings, and decorative and functional articles, woods or at least wood-like surfaces are still in great demand. Heretofore, such articles have been covered by the method of heating wood in rod form or veneer form, bamboo, or wisteria vine to render the material pliable and then bonding the material with an adhesive onto the base structure of an article thereby to cause a pattern such as wood grain to appear at the outer surface of the article.

By this method, however, since curved parts, T-shaped joints, and other geometrical features are present in the configruations of many of such articles, the material must be cut to fit these curved parts or dimensions determined by the geometrical features, whereby there is much waste of material. Particularly in the case of items of furniture with many curvatures, the covering material must be spliced in accordance with the curvatures, whereby the wood grain pattern is impaired.

Accordingly, in order to overcome these difficulties, there has recently been proposed a method which comprises cutting a raw material such as wood, bamboo, wisteria, or some other natural plant material into long thin pieces of flexible rod form, rendering several of these pieces into an aggregated structural material with a synthetic resin adhesive, and moulding this material under heat and pressure on and integrally with the outer surface of an article such as an item of furniture or utensil.

By this method, the rod-shaped material, being flexible, can be readily bent to conform to curvatures in the base structure of the article, and, moreover, there is little waste. However, since the pieces of rod-shaped material have been cut along the grain of the fibers of the raw material, bending of the covering material gives rise to ragged splintering at the bend, whereby there is danger of injury to the human body and damage to other articles.

Furthermore, since the pieces of rod-shaped material have longitudinal directions along the grain of their fibers, their grain pattern is plain and monotonous and is limited to merely exhibiting this natural configuration. Therefore, it is not possible by this proposed method to obtain highly intricate and complex designs of patterns.

It is an object of the present invention to overcome the above described difficulties and shortcomings of known methods. More specifically, an object of the invention is to provide a method for readily forming composite coverings with wood-like grain patterns over the surfaces of articles, even articles of complex curvatures, without waste of material and without the occurrence of splintering at the curvatures. Another object of the invention is to provide a method as stated above whereby the wood-like grain patterns can be controlled at will to conform to any desired design without imparing the beauty of original natural grains.

According to the present invention, briefly summarized, there is provided a method for forming a covering of composite material on an article which comprises rendering a fibrous plant material such as wood, bamboo, or wisteria into film sheets of required length, that is, forming thin film veneers of a length such that, following treatment according to this invention, sufficient material is provided to cover the article being treated, coating these sheets with a synthetic resin adhesive, partly hardening the adhesive thus applied, crimping and ruffling the sheets thus coated into thin ruffled elements of string-like form, laying or wrapping these ruffled elements over the surface of the article, and moulding the ruffled elements thus laid or wrapped under heat and pressure.

The nature, principle, and the details of the invention, as well as the utility thereof, will be more clearly apparent from the following detailed description with respect to preferred embodiments of the invention when read in conjunction with the accompanying drawing, in which like parts are designated by like reference numerals.

Figure 4:
Figure 5:
Figure 6:
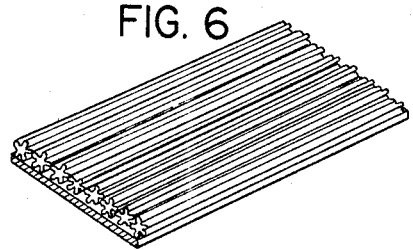
Figure 7:
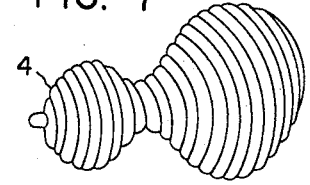
Figure 8:
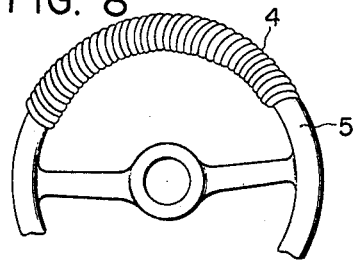
Figure 9:
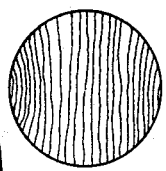
Figure 10:
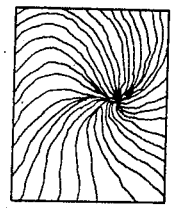
Figure 11:
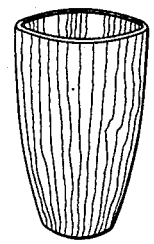
Figure 12:
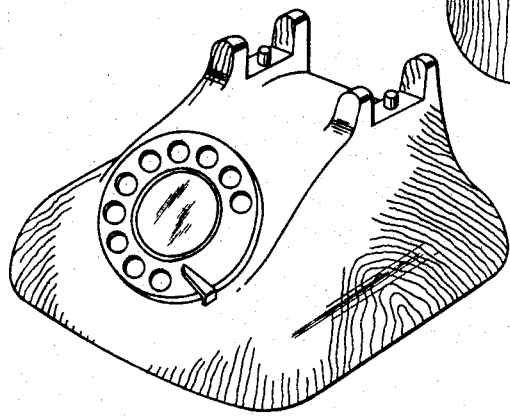

In the drawing:
FIGS. 1 through 5, inclusive are perspective views showing progressive process stages by which the material elements for the composite material according to the invention are prepared;
FIGS. 6 and 7 are perspective views and FIG. 8 is a partial planar view showing various applications of the composite material according to the invention;
FIGS. 9 and 10 are planar views showing examples of surface patterns produced in accordance with the invention; and
FIGS. 11 and 12 are perspective views showing examples of moulded articles covered decoratively according to the invention.

Figure 2:
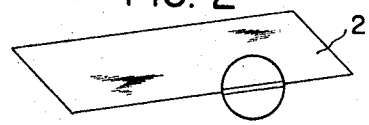

The composite material for use according to the invention is prepared in the following manner. After the outer skin of a raw material 1 such as a wood log as shown in FIG. 1, has been removed, the material 1 is cut to the desired length to form a bolt, which is then cut in a rotary cutting machine (also known as a rotary peeling machine) or a slicing machine to produce very thin sheets or films of veneer 2 (herein referred to as "veneer film" or "film") as shown in FIG. 2 of from 0.1 to 0.8 mm. in thickness.

Figure 3:

On one side of each veneer film 2 thus formed, a thermosetting synthetic resin adhesive 3 is applied as indicated in FIG. 3. Examples of suitable resins for the thermosetting adhesive 3 are phenol resins, melamine resins, epoxy resins, polyester resins, resorcinol resins, urea resins, and acryl resins. Each veneer film 2 thus coated with the adhesive 3 is then dried or partially hardened or set at a suitable temperature between room temperature or 20 degrees and 28 degrees C. until the adhesive 3 assumes a half hardened state. Thereafter, veneer films as single sheets or a plurality of sheets in stacked state are crimped as indicated in FIG. 4 and bunched into thin ruffled elements 4 each of string-like form with multiple folds and crenulations in cross section as indicated in FIG. 5. The veneering, coating, heating, crimping and ruffling procedures can all be carried out in any well known manner obvious to those skilled in the art.

The material elements 4 thus prepared can be used in an almost limitless number of ways to form the finished outer surfaces of a wide range of articles. In general, the material elements 4 of the desired character and number are laid in accordance with the desired pattern over an article to be covered as illustrated in FIGS. 6, 7 and 8, and then the article with the elements 4 is pressure moulded in a mould at the setting temperature of the adhesive 3 thereby to cause the elements 4 to be densely moulded and integrally bonded to the article. Conventional pressure molding techniques are also well known in the art and can be used according to this invention.

For example, in order to cover the handle grip of a steering wheel of a motor vehicle with elements 4, the elements 4 are first wrapped around the base structure 5 of the handle grip as indicated in FIG. 8. The handle grip is then placed in a heating mould, and, as the handle grip is heated by means such as a high-frequency heating device at the setting temperature of the adhesive adhering to the elements 4, a pressure of from 5 to 100 kg./cm.$^2$, depending on the size of the handle grip, is applied thereon to accomplish pressure moulding of the composite material onto the base structure 5. Thereafter the surface of the handle grip is finished by sanding and, if necessary, is given a surface coating of paint or polished thereby to produce the final finish.

In an article moulded in the above described manner in accordance with the present invention, the natural grain patterns and straight grains of the original wood material appear on the surface, and, moreover, the natural color tones of the grains can be further rendered elegant and refined by the aggregation of the material elements 4, where a unique, aesthetically pleasant pattern can be obtained.

Furthermore, displacements in the grain pattern, if any, at severely curved parts of the material elements 4 are merely of the order of fine straight-line cracks perpendicular to the grain direction or of partial separations of imbricate form, and sharp splintering of ragged form of the character often resulting from known techniques is not produced. Accordingly, there is no danger of injury to the human body or damage to other articles.

In other examples of embodiment of the invention as illustrated in FIGS. 9 and 10, the base articles are respectively a spherical article and a flat-plate article which have been covered with the elements 4 moulded thereon. In applying the method of the invention to these articles, the material elements 4 are laid over the base article as indicated in FIGS. 6 and 7, and held in place by pieces of suitable tape. Then each article, with the elements 4 thus held, is placed in a heating mould and subjected to heat and pressure. By this process, grain patterns as shown in FIGS. 9 and 10 can be obtained in a simple manner.

The method of the present invention is applicable, furthermore, to hollow articles and to articles having configurations of complex curvatures and projections as illustrated by a vessel and a desk telephone set in FIGS. 11 and 12, respectively. Even in the case of an article of such complex configuration, the base article can be covered in a simple manner to produce aesthetically pleasing patterns.

By the practice of the present invention as described above, a raw material is rendered into an extremely thin veneer film, which is then crimped and bunched into thin ruffled elements, and a large number of these elements are used in aggregate form. For this reason, even when splits, stains, knots, and other defects are present in the raw material, they do not appear directly on the moulded surface as in articles covered by known methods, whereby material waste and rejection are substantially reduced. Moreover, even articles having complex shapes can be readily covered with the composite material of the invention.

Furthermore, in addition to natural grain patterns, artificially designed figures can be formed at will by introducing twists and bends in the ruffled elements, whereby it is possible to produce diversified patterns.

It should be understood, of course that the foregoing disclosure relates to only preferred embodiments of the invention and that it is intended to cover all changes and modifications of the examples of the invention herein chosen for the purposes of the disclosure, which do not constitute departure from the spirit and scope of the invention as set forth in the appended claims.

What I claim is:

1. A method for forming a covering of desired woodgrain pattern on an article which comprises forming thin film veneers from a fibrous plant material, said film veneers being of a thickness of from about 0.1 to 0.8 millimeter and of a length sufficient for covering the article, coating said film veneers with a thermosetting adhesive material, heating the coated film veneers at a temperature sufficient to partially harden said adhesive, crimping and ruffling the thus treated film veneers to form thin ruffled elements of string-like form, disposing said ruffled elements on the surface of the article in the desired pattern to form a composite layer, and molding said composite layer under heat and pressure to adhesively secure said ruffled elements to the surface of the article.

2. The method of claim 1 wherein said coated film veneers are heated to a temperature between room temperature or 20° and 28° C.

References Cited

UNITED STATES PATENTS 3,054,714  9/1962  Johnston _____ 264—112

FOREIGN PATENTS 658,242  10/1951  Great Britain.

ROBERT F. WHITE, Primary Examiner

J. R. HALL, Assistant Examiner

U.S. Cl. X.R.

264—245